(12) United States Patent
Sundar et al.

(10) Patent No.: US 12,068,001 B2
(45) Date of Patent: Aug. 20, 2024

(54) ACOUSTIC EVENT DETECTION

(71) Applicant: Amazon Technologies, Inc., Seattle, WA (US)

(72) Inventors: Harshavardhan Sundar, Medford, MA (US); Sheetal Laad, Lexington, MA (US); Jialiang Bao, Malden, MA (US); Ming Sun, Winchester, MA (US); Chao Wang, Newton, MA (US); Chungnam Chan, Westford, MA (US); Cengiz Erbas, Acton, MA (US); Mathias Jourdain, Seattle, WA (US); Nipul Bharani, Seattle, WA (US); Aaron David Wirshba, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 18/243,800

(22) Filed: Sep. 8, 2023

(65) Prior Publication Data
US 2024/0071407 A1    Feb. 29, 2024

Related U.S. Application Data

(63) Continuation of application No. 17/216,840, filed on Mar. 30, 2021, now Pat. No. 11,783,850.

(51) Int. Cl.
| | |
|---|---|
| *G10L 25/51* | (2013.01) |
| *G10L 15/06* | (2013.01) |
| *G10L 15/22* | (2006.01) |
| *G10L 25/78* | (2013.01) |

(52) U.S. Cl.
CPC ............ *G10L 25/51* (2013.01); *G10L 15/063* (2013.01); *G10L 15/22* (2013.01); *G10L 25/78* (2013.01); *G10L 2015/0635* (2013.01)

(58) Field of Classification Search
CPC ....... G10L 25/51; G10L 15/063; G10L 15/22; G10L 25/78; G10L 2015/0635
See application file for complete search history.

(56) References Cited

U.S. PATENT DOCUMENTS

| | | | |
|---|---|---|---|
| 2005/0131684 A1* | 6/2005 | Clelland ................. | G10L 15/22 704/E15.04 |
| 2015/0302855 A1* | 10/2015 | Kim ....................... | G10L 15/22 704/275 |
| 2015/0302856 A1* | 10/2015 | Kim ....................... | G10L 15/22 704/273 |
| 2018/0130469 A1* | 5/2018 | Gruenstein ............. | G10L 25/51 |
| 2020/0118544 A1* | 4/2020 | Lee ........................ | G10L 15/063 |
| 2020/0150919 A1* | 5/2020 | Rand ...................... | H04R 1/406 |

(Continued)

*Primary Examiner* — Mohammad K Islam
(74) *Attorney, Agent, or Firm* — Pierce Atwood LLP

(57) ABSTRACT

Techniques for detecting certain acoustic events from audio data are described. A system may perform event aggregation for certain types of events before sending an output to a device representing the event is detected. The system may bypass the event aggregation process for certain types of events that the system may detect with a high level of confidence. In such cases, the system may send an output to the device when the event is detected. The system may be used to detect acoustic events representing presence of a person or other harmful circumstances (such as, fire, smoke, etc.) in a home, an office, a store, or other types of indoor settings.

20 Claims, 11 Drawing Sheets

(56) References Cited

U.S. PATENT DOCUMENTS

2021/0390948 A1\* 12/2021 Shah .................. G10L 15/22
2021/0409878 A1\* 12/2021 Pedersen .............. H04R 25/405
2022/0284883 A1\* 9/2022 Buchter ................ G10L 15/20

\* cited by examiner

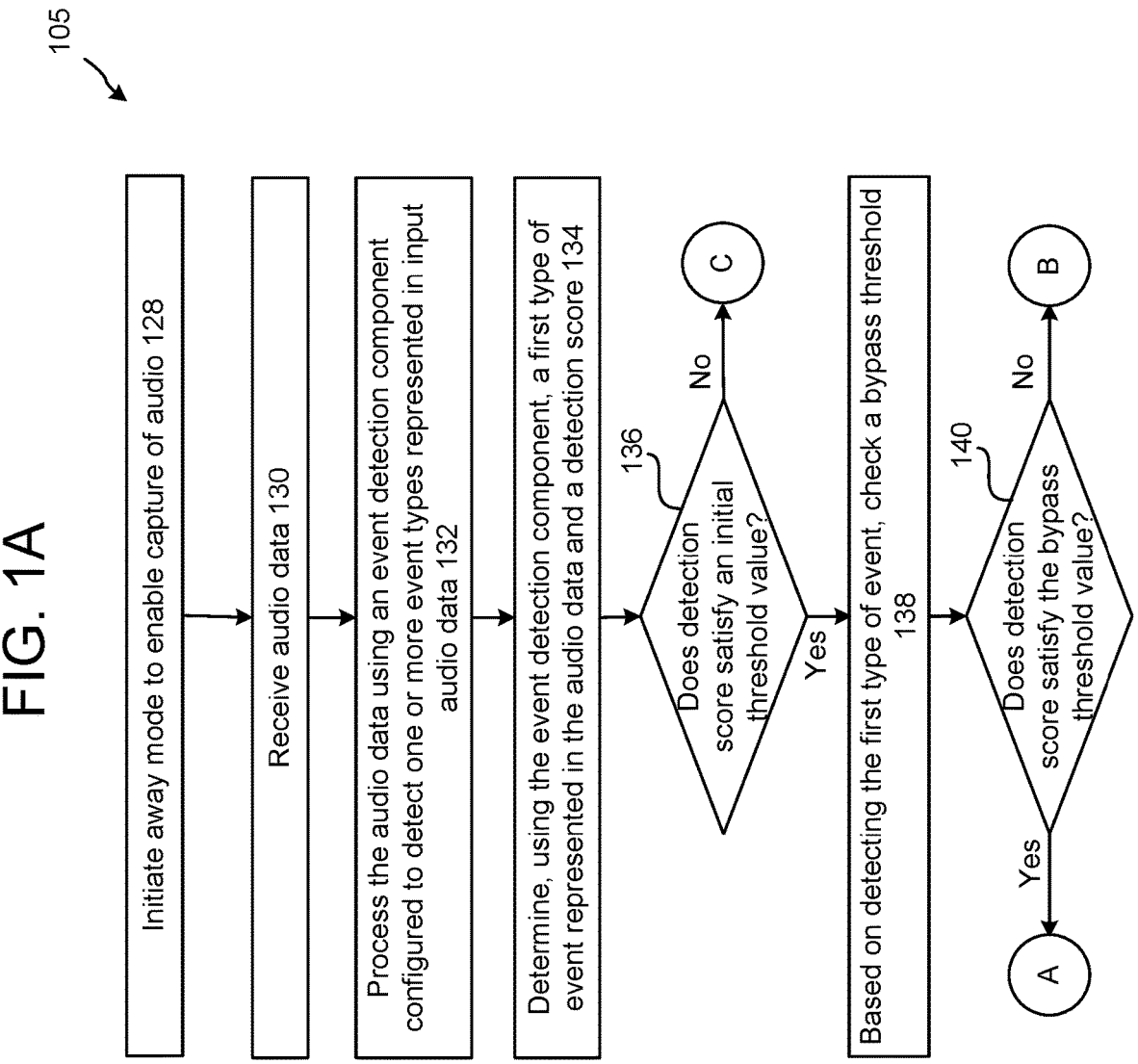

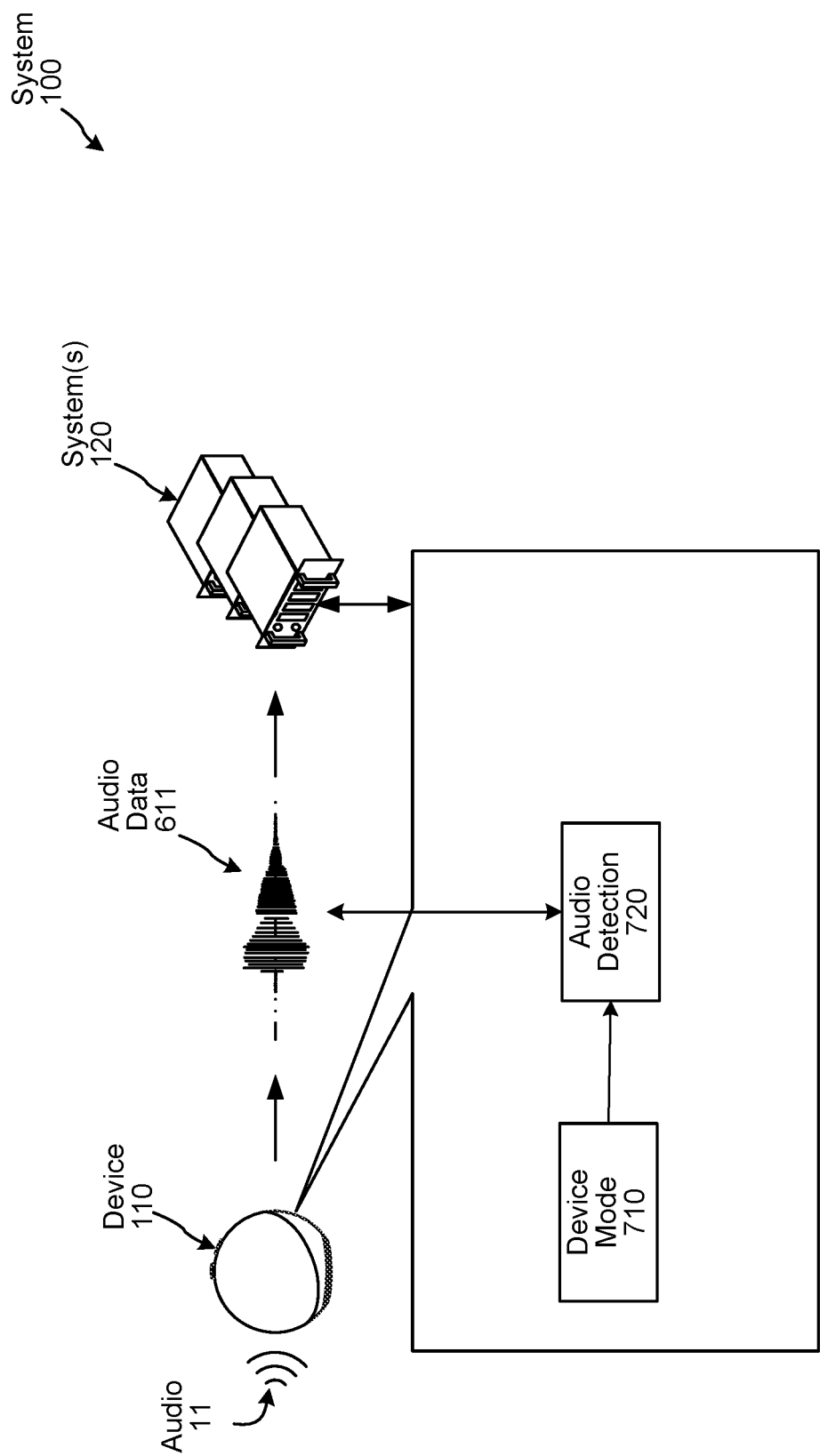

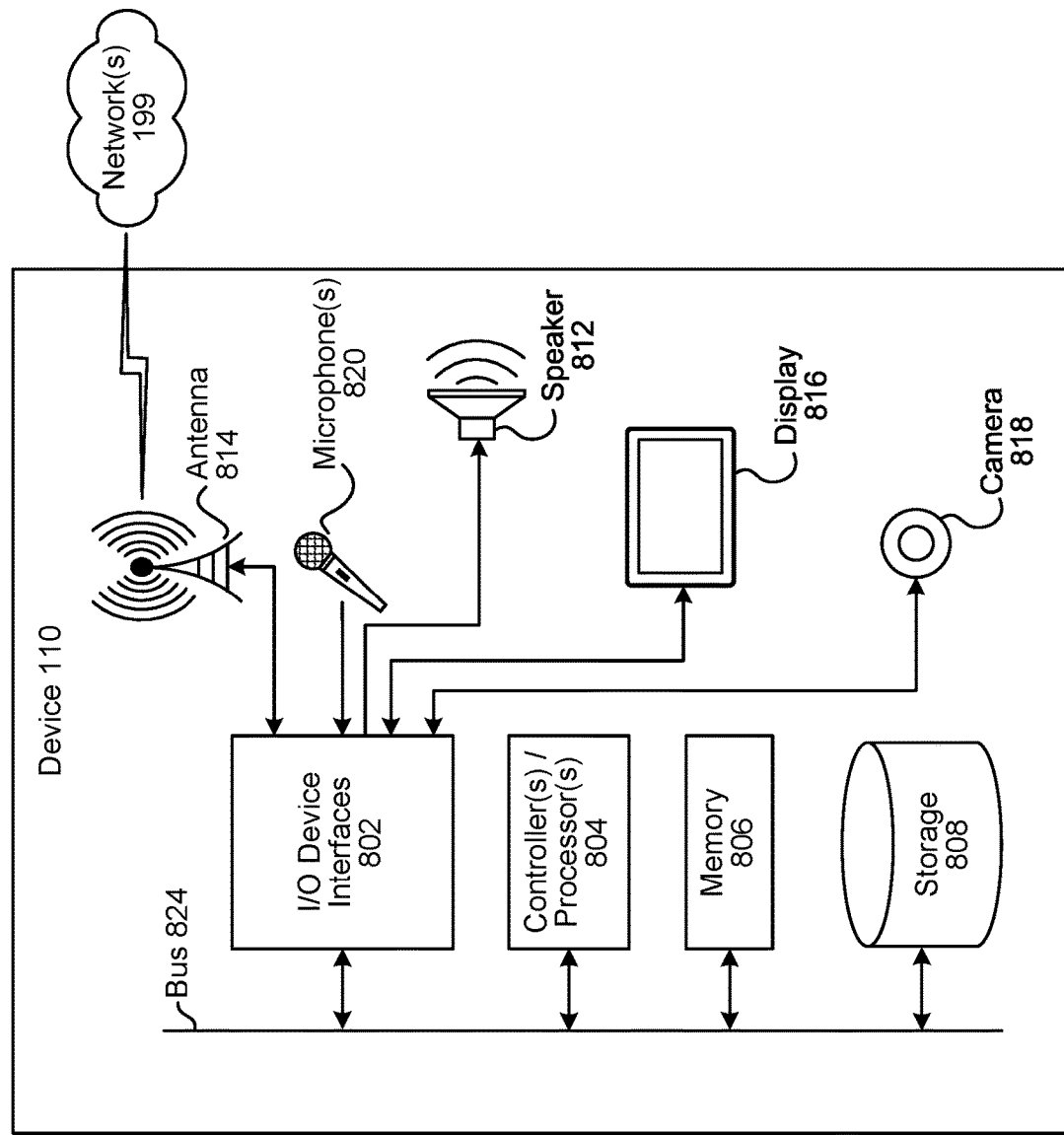

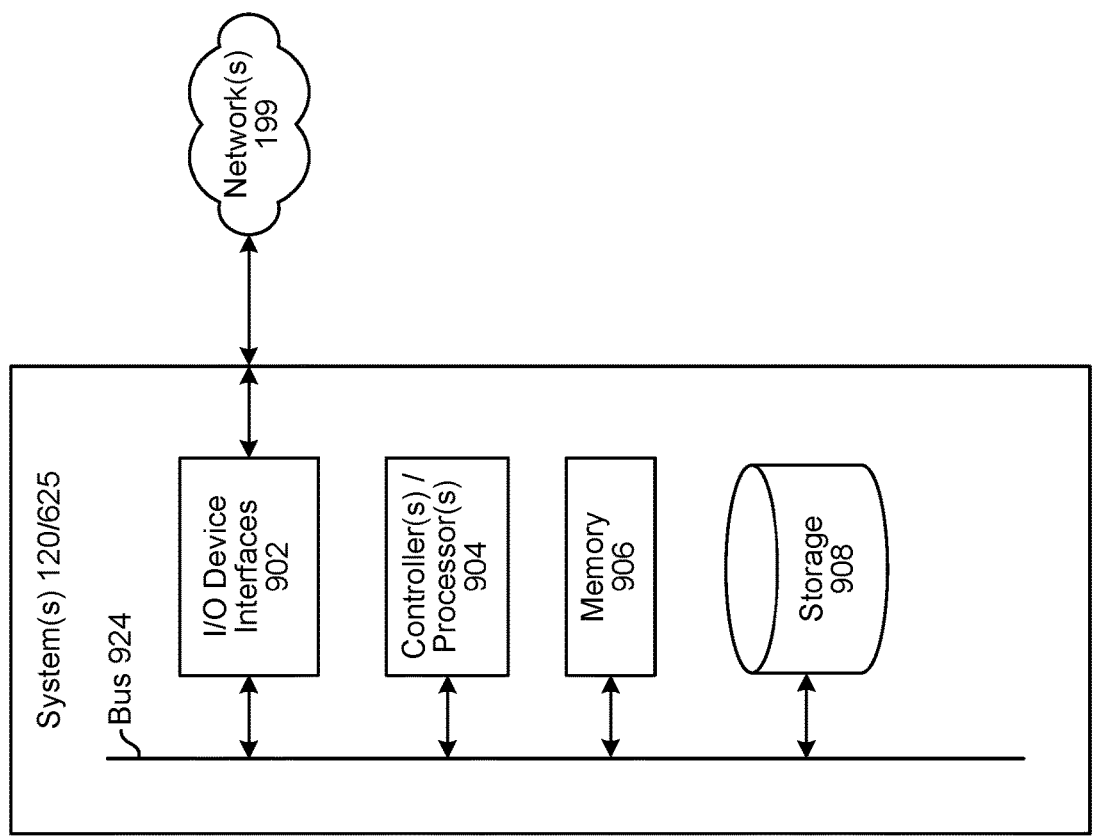

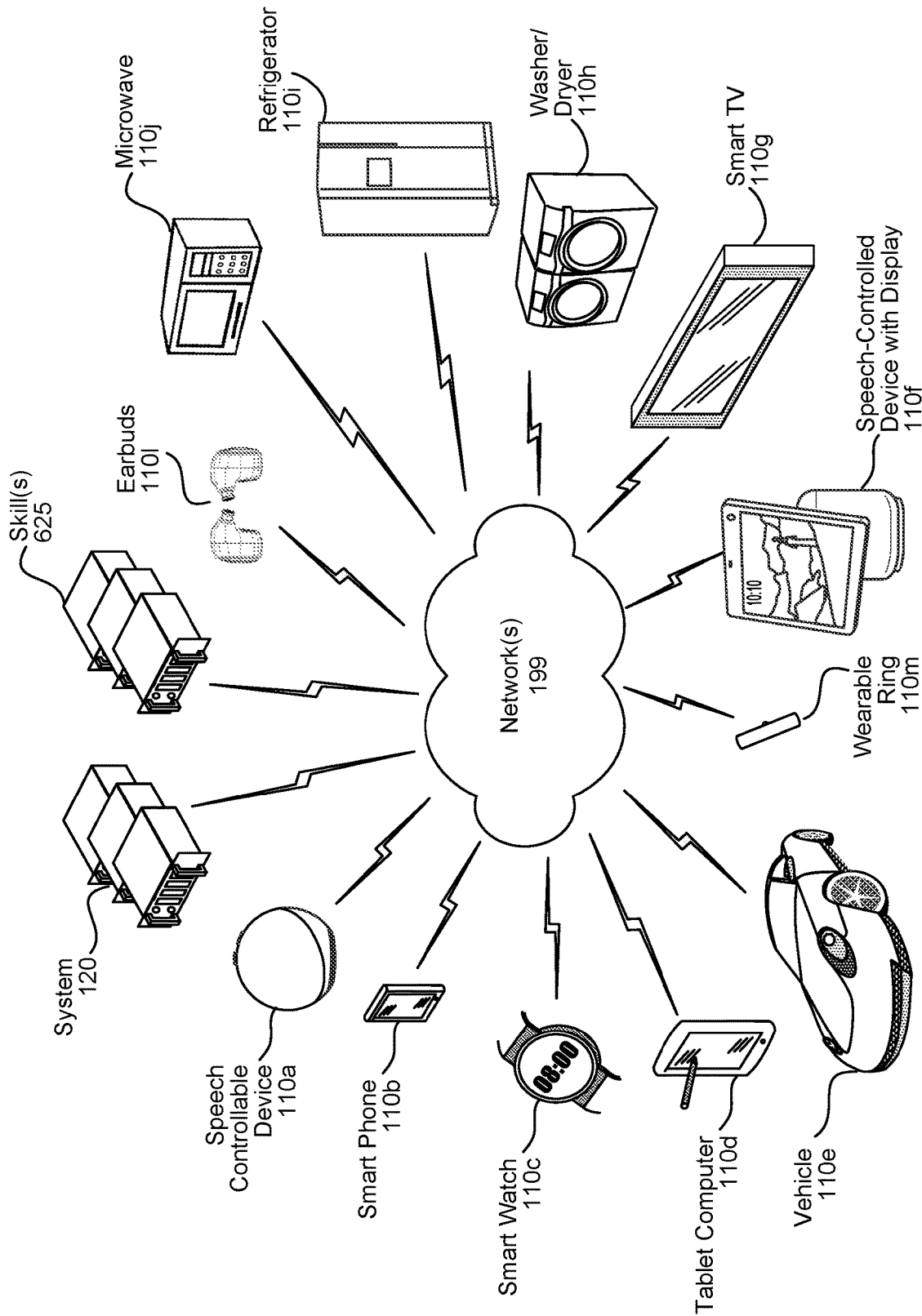

ACOUSTIC EVENT DETECTION

CROSS-REFERENCE TO RELATED APPLICATIONS

This application is a continuation of and claims the benefit of priority to U.S. patent application Ser. No. 17/216,840, filed Mar. 30, 2021, entitled ACOUSTIC EVENT DETECTION, the entire contents of which are incorporated herein by reference for all purposes.

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1B are flowcharts illustrating an example process to detect one or more acoustic events, according to embodiments of the present disclosure.

FIG. 7 is a conceptual diagram illustrating components that may be included in a device, according to embodiments of the present disclosure.

FIG. 8 is a block diagram conceptually illustrating example components of a device, according to embodiments of the present disclosure.

FIG. 9 is a block diagram conceptually illustrating example components of a system, according to embodiments of the present disclosure.

FIG. 10 illustrates an example of a computer network for use with the overall system, according to embodiments of the present disclosure.

DETAILED DESCRIPTION

Figure 1B:
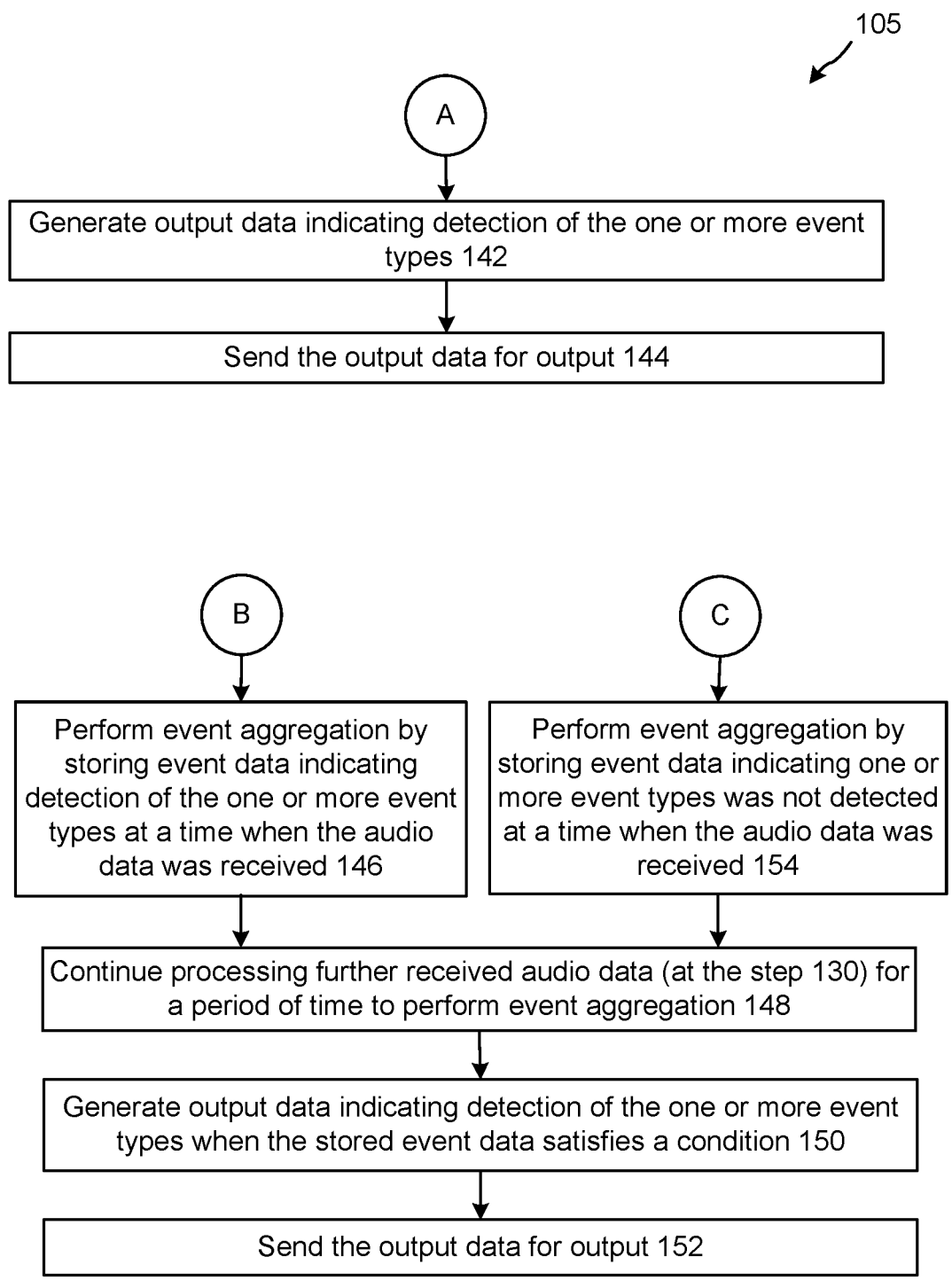

Certain systems may be configured to detect occurrence of particular acoustic events from audio data captured by a microphone(s) of a device. In some cases, the particular acoustic events that the system may be configured to detect may indicate presence of a person in the area where the device is located. Detection of such events can be part of a security or other type of monitoring system, and can aid in generating event-specific alerts (unauthorized intruder, baby crying, dog whining, cat scratching, smoke alarm sounding, appliance beeping for supplies, etc.) for a household, an office, a business, or other types of locations. For example, the system may be configured to process audio data to detect events such as speech from a person, non-speech sounds by a person (e.g., coughing, sneezing, snoring, crying, laughing, shouting, footsteps, etc.), glass breaking (e.g., someone breaking a window, plate, or a door panel), door or window opening, sounds by pets (e.g., a dog barking, cat scratching), alarms (e.g., smoke alarm, fire alarm, etc.) and other types of events that may have unique and identifiable sounds to humans and/or machines. Security and monitoring systems, for example, often require a low-latency detection system, as a user has to be notified as soon as possible of a potential intruder. Such systems may also require a low false alarm rate.

The present disclosure describes techniques for reducing latency and reducing false alarm rates in detecting certain acoustic events. A system of the present disclosure uses different methods to determine whether a detected event should result in an output, such as an alert at the monitoring location, email/notification alert at a remote device, etc. The method used may depend on a type of event detected by the system and/or a system component's confidence in detecting the event. In some embodiments, the methods may include performing event aggregation or performing bypass processing (involving bypassing the event aggregation process).

In performing event aggregation, the system may process audio data for a period of time (e.g., 10 seconds) to detect occurrence of an event (from a predefined list of events), and then the system may process subsequent audio data for another period of time (e.g., the next 10 seconds) to detect occurrence of an event. The system may record whether or not events were detected over a period of time (e.g., 1 minute), and based on the number of times an event is detected, the system may determine to output an alert. Such technique may help reduce the false alarm rate. For example, using event aggregation may reduce a false alarm rate in detecting an event such as a smoke alarm that typically involves repeating an audio signal for a duration of time. The system may perform event aggregation to gain more confidence in its detection of the event.

The system may detect certain events, such as human speech, more accurately than other events partly because of the availability of training data and/or the non-ambiguous nature of how human speech is represented in audio (as compared to footsteps, for example, which sound similar to other noises). Certain events, such as footsteps, may vary significantly in how they are represented in audio data (e.g., depending on the type of shoes, depending on how the person walks, depending on the type of floor, etc.), and the system may be less accurate in detecting such events. To reduce latency, the system may bypass the event aggregation process, if the system detects a certain type of event with a certain level of confidence. For example, if the system detects human speech in the audio data with a high confidence level, then the system may generate an alert, instead of aggregating detected events for a period of time before generating the alert, thus reducing latency.

Furthermore, the system of the present disclosure achieves the complex task of detecting presence of a person (e.g., an intruder), particular sounds by a person (e.g., a baby crying), state of a device (e.g., smoke or fire alarm, beeping indicating refill of ink/filter/paper/consumable needed), and/or other audio event by using a fine-grained event detector configured to separately detect occurrence of a predefined set of acoustic events that may indicate presence of a person. The system may apply event aggregation and bypass processing separately based on the type of event detected. In determining to output the alert, the system may only consider the event that the system detects with the highest confidence as compared to the other events detected by the system. For example, the system may detect possible occurrence of three events in the audio data: door opening, footsteps and human speech, and may detect the human speech event with the highest confidence. Based on the confidence of detecting the human speech satisfying certain thresholds, the system may output a human presence event indicator.

The techniques of the present disclosure may provide an improved user experience by reducing latency and false alarm rates in home security and monitoring systems.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The systems, devices, components, and techniques can be implemented on a geographic basis to ensure compliance with laws in various jurisdictions and entities in which the components of the systems, devices, components, and/or user are located.

FIGS. 1A and 1B show an example process 105 that may be performed to detect one or more acoustic events from audio data. In some embodiments, steps of the process 105 may be performed by a device 110a (e.g., devices 110 shown in FIG. 10). In other embodiments, steps of the process 105 may be performed by a system(s) 120 (e.g., system(s) 120 shown in FIG. 6). In yet other embodiments, some steps of the process 105 may be performed by the device 110, while other steps may be performed by the system(s) 120.

Referring to FIG. 1A, a device 110a/the system(s) 120 initiates (128) an away mode to enable capture of audio. A user of the device 110a may provide an input, via the device 110a or the device 110b, to set the device 110a to the away mode. The away mode, in some embodiments, may indicate that the user is "away" from the location (e.g., home, office, etc.) where the device 110a is. In other embodiments, the user may set the device 110a to the away mode to enable monitoring of audio events in the device's environment (e.g., monitor for a baby crying, monitor for a device state, such as, a washing machine completing a cycle, a printer being out of ink/toner, etc.) Being in the away mode, the device 110a is able to capture audio and send audio data to the system(s) 120 without detecting device-directed speech (e.g., a wakeword). In the away mode, one or more microphones of the device 110a may be active/open to capture any audio generated in the device's 110a environment. For example, the open microphone of the device 110a may capture an audio 11 (shown in FIG. 6.

In some embodiments, the device 110a may include a component to determine whether the audio 11 corresponds to an event of interest, prior to sending the audio data to the system(s) 120 for processing or to another component on the device 110a for processing. This component may include one or more machine learning models, such as a binary classifier, which may be a coarse/fast/small model that may process the audio 11 or corresponding audio data to determine whether the audio 11 represents an event of interest. The binary classifier may be trained using multiple different audio data representing various different events of interest. If the binary classifier determines that the audio 11 includes an event of interest, then the device 110a may send the corresponding audio data to the system(s) 120 for processing.

The device 110a/the system(s) 120 receives (130) audio data. In some embodiments, the device 110a may be located in an indoor space, such as a house, an office, a store, etc. The device 110a may capture the audio 11 using one or more microphones of the device 110a, may determine the audio data using the audio 11, and may send the audio data to the system(s) 120 or a component on the device 110a for processing. In some embodiments, the audio data may correspond to a particular length of audio, for example, ten seconds of audio. In some embodiments, the audio data may be a frequency domain representation (a spectrum) of the audio 11. In other embodiments, the audio data may be a time domain representation (waveform) of the audio 11.

The device 110a/the system(s) 120 processes (132) the audio data using an event detection component configured to detect one or more event types represented in input audio data. The event detection component may include one or more machine learning (ML) models configured to process audio data to detect occurrence of an acoustic event. In some embodiments, the event detection component may be configured to detect occurrence of one or more events from a set of event types. For example, the event detection component may be configured to detect one or more of the following events: (1) human speech, (2) non-speech sounds produced by human, (3) singing, (4) human movement and (5) special presence events. In some embodiments, the ML model(s) of the event detection component may be a multi-label classifier, such that the event detection component may determine more than one label, representing a detected event, corresponding to the audio data.

The device 110a/the system(s) 120 determines (134), using the event detection component, a first type of event represented in the audio data and a detection score. The first type of event may be one of the example events described above that the event detection component may be configured to detect. The detection score may represent a likelihood of the first type of event being represented in the audio data. In some embodiments, the detection score may represent a confidence of the event detection component in detecting the first type of event in the audio data. In some cases, the event detection component may determine that more than one event type is represented in the audio data, and may determine a respective detection score for each of the detected events.

The device 110a/the system(s) 120 determines (136) whether the detection score satisfies an initial threshold value. The initial threshold value may relate to the first event type. That is, the device 110a/the system(s) 120 may use a first initial threshold value for the first type of event, and may use a different second initial threshold value for a second type of event, etc. In other embodiments, the initial threshold value may be the same for each of the types of events. If the detection score satisfies the initial threshold value (for example, the detection score exceeds the initial threshold value), then the system(s) 120 performs step 138.

The device 110a/the system(s) 120, based on detecting the first type of event, checks (138) a bypass threshold value. The device 110a/the system(s) 120 may check the bypass threshold only when certain types of events are detected in the audio data. For example, the device 110a/the system(s) 120 may check the bypass threshold for the following event types: (1) human speech, (2) human singing and (3) non-speech sounds by a human. The device 110a/the system(s) 120 determines (140) whether the detection score satisfies the bypass threshold value. The bypass threshold value may be the same for each of the type of events. In other embodiments, the bypass threshold value may be unique to one or more types of events. If the detection score satisfies the bypass threshold (for example, the detection score exceeds the bypass threshold) then the device 110a/the system(s) 120 performs a step 142 (shown in FIG. 1B).

Referring to FIG. 1B, the device 110a/the system(s) 120 generates (142) output data indicating detection of the one or more event types. In some embodiments, the output data may not indicate the specific event type detected in the audio data. The output data may be notification data including text and/or graphics. The output data may be a message (e.g., an email, a SMS, a voice message, etc.). The output data may be synthesized speech and/or text that can be displayed at a device 110.

The device 110a/the system(s) 120 sends (144) the output data for output. The output data may be sent to the first device 110a or the second device 110b (e.g., by the system(s) 120 or the device 110a). The first device 110a may be associated with one or more user and/or group profile identifiers, and the second device 110b may be associated with at least one of the one or more user and/or group profile identifiers that the first device 110a is associated with. The device 110a/the system(s) 120 may cause both of the devices 110a and 110b (or more devices 110) to output the output data depending on user and/or group profile configurations. Sending of the output data may cause the first device 110a and/or the second device 110b to output an alert indicating that an audio event (e.g., presence of an intruder, fire alarm, baby crying, cry for help, etc.) is detected where the first device 110a is located. The alert may be outputted for a user associated with the device 110a and the device 110b. In other cases, the alert may be outputted via a device 110 associated with a security and monitoring company (that may be set up in the profile data to receive alerts), a device 110 associated with a local law enforcement department based on location data for the device 110a, a device 110 associated with a local fire department based on location data for the device 110a, etc. Sending of the output data may cause the device 110a or the device 110b to receive/output an email, a text message, an app notification, a phone call to user, a phone call to monitoring service, a phone call to emergency contact, etc.

Although the disclosure describes detecting acoustic events that may indicate presence of a person, such as an intruder, the device 110a/the system(s) 120 may be configured to detect acoustic events that may indicate other issues in the indoor setting, such as, presence of a fire (by detecting a fire alarm in the audio data), presence of smoke (by detecting a smoke alarm in the audio data), presence of carbon monoxide (by detecting a carbon monoxide alarm in the audio data), etc. The device 110a/the system(s) 120 may be configured to detect other acoustic events such as a baby crying, an elderly person shouting for help, a dog barking, etc.

Referring to the decision block 140 shown in FIG. 1A, if the device 110a/the system(s) 120 determines that the detection score does not satisfy the bypass threshold, then the device 110a/the system(s) 120 performs a step 146 shown in FIG. 1B. The device 110a/the system(s) 120 performs (146) event aggregation by storing event data indicating detection of the one or more event types at a time when the audio data was received (in the step 130). The device 110a/the system(s) 120 may store the event data including a "true" ("yes" or "1") indicator to indicate that one or more event types are represented in the audio data. The event data may also include a timestamp representing when the audio data was received from the device 110a (or when the audio 11 was captured by the device 110a).

Referring to the decision block 136 shown in FIG. 1A, if the device 110a/the system(s) 120 determines that the detection score does not satisfy the initial threshold, then the system(s) 120 performs a step 154 shown in FIG. 1B. The device 110a/the system(s) 120 performs (154) event aggregation by storing event data indicating one or more event types was not detected at a time when the audio data was received (at the step 130). The device 110a/the system(s) 120 may store the event data including a "false" ("no" or "0") indicator to indicate that one or more event types is not represented in the audio data. The event data may also include a timestamp representing when the audio data was received from the device 110a (or when the audio 11 was captured by the device 110a).

After steps 146 and 154, the device 110a/the system(s) 120 continues (148) processing further received audio data (at the step 130) for a period of time to perform event aggregation. That is, the device 110a/the system(s) 120 may receive further audio data that may correspond to audio captured immediately subsequent to the audio 11. The device 110a/the system(s) 120 may perform the steps described above, in relation to FIGS. 1A and 1B, with respect to the further audio data. For example, if a detection score corresponding to the first type of event represented in the further audio data satisfies the bypass threshold (at the decision block 140), then the device 110a/the system(s) 120 may generate and send output data to the device(s) 110a, 110b alerting a user of the presence of a person. If the decision score corresponding to the further audio data does not satisfy the bypass threshold, then the device 110a/the system(s) 120 may continue aggregating event data to perform event aggregation. In this manner, if the detection score for the detected first event type does not satisfy the bypass threshold, then the device 110a/the system(s) 120 performs event aggregation.

The device 110a/the system(s) 120 generates (150) output data indicating detection of the one or more event types when the stored event data satisfies a condition. The condition may relate to the number of times one or more event types is detected in received audio data for a period of time. For example, the device 110a/the system(s) 120 may aggregate event data by storing event data corresponding to processing of audio data received at the device 110a/the system(s) 120 (as described in relation to the steps 146 and 154). The device 110a/the system(s) 120 may process chunks of audio data, for example ten seconds of audio data. As part of event aggregation, the device 110a/the system(s) 120 may process audio data for a period of time, for example, 60 seconds. If the device 110a/the system(s) 120 detects one or more event types at least a particular number of times (e.g., at least three times) during the 60 seconds, then the device 110a/the system(s) 120 may determine that the condition is satisfied. In other words, the device 110a/the system(s) 120 may be confident that the detected events, over the period of time, indicate presence of a person. In response to the condition being satisfied, the device 110a/the system(s) 120 may generate the output data. The output data may be similar to the output described in relation to the step 142. The device 110a/the system(s) 120 sends (152) the output data for output, for example, to the first device 110a and/or the second device 110b. The output data may be sent to the device(s) 110a, 110b in a similar manner as described in relation to the step 144.

In example embodiments, a system 100 may include a (first) device 110a that may capture the audio 11, a (second) device 110b, and a system(s) 120, each in communication across a network(s) 199 (shown in FIGS. 8-10). The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

Figure 2:
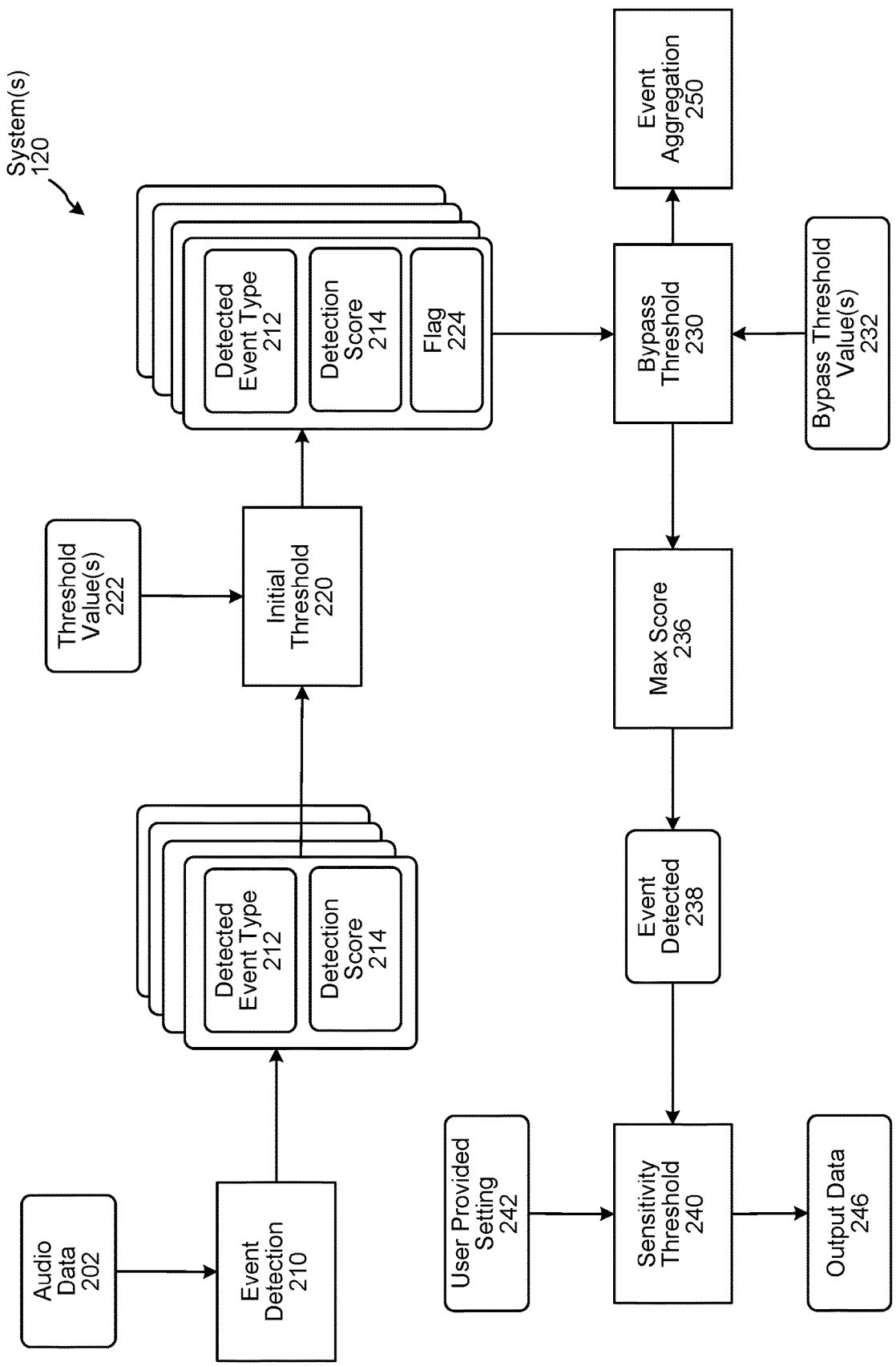
FIG. 2 is a conceptual diagram showing how a system may process audio data to detect one or more events, according to embodiments of the present disclosure.

FIG. 2 is a conceptual diagram showing how the system(s) 120 may process audio data to detect one or more events, according to embodiments of the present disclosure. The components shown in FIG. 2 may be included in the system(s) 120 (shown in FIGS. 1A, 1B, 6 and 7). In other embodiments, the components shown in FIG. 2 may be included in the device 110 (e.g., the device 110a that captures the audio 11). In other embodiments, some of the components may be included in the system(s) 120 and the other components may be included in the device 110.

Figure 3:
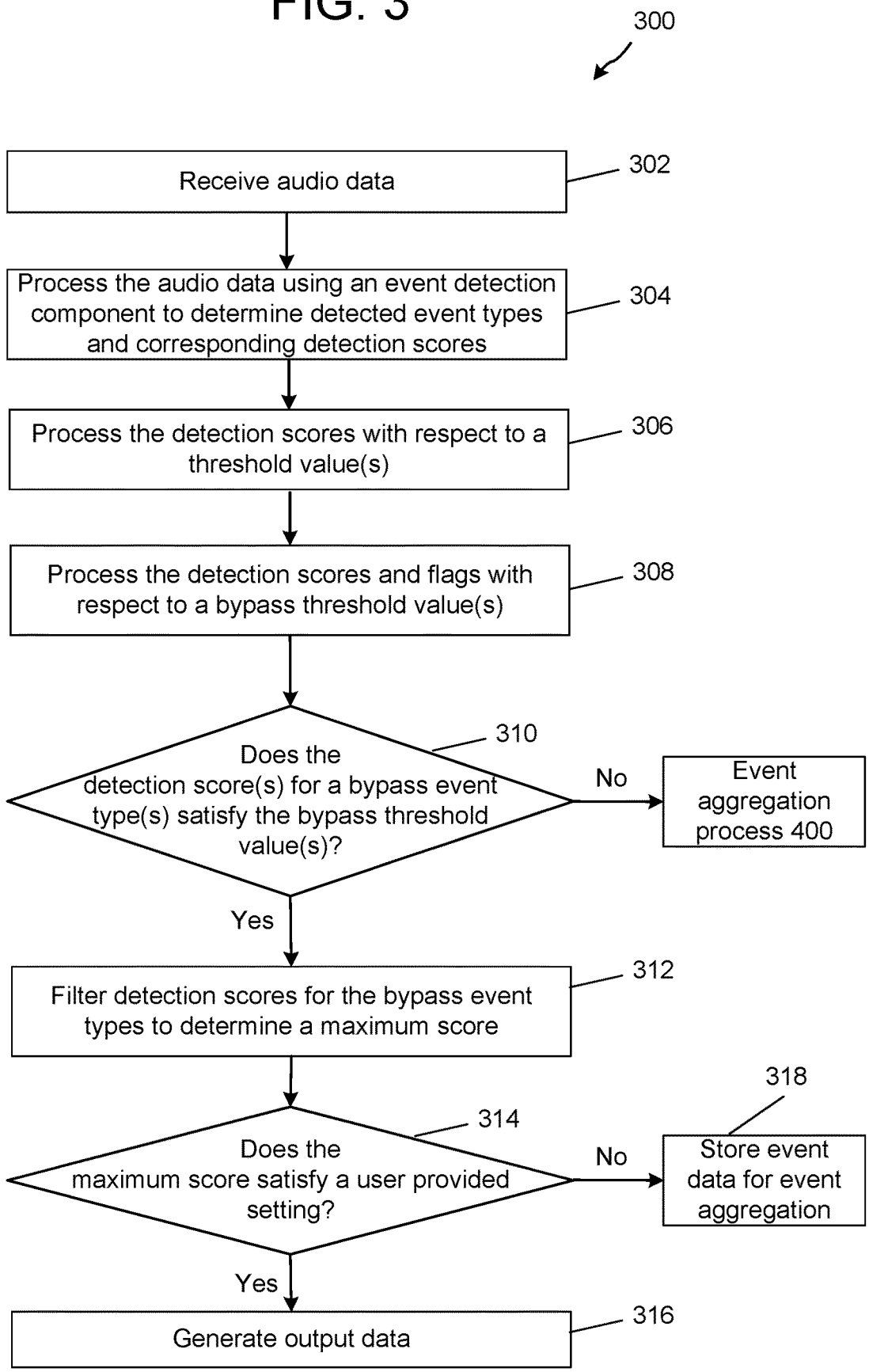
FIG. 3 is a flowchart illustrating an example process that may be performed by the system of FIG. 2, according to embodiments of the present disclosure.

FIG. 3 is a flowchart illustrating an example process 300 that may be performed by the system(s) 120 using the components shown in FIG. 2, according to embodiments of the present disclosure. The system(s) 120 may receive, at a step 302, audio data 202. The audio data 202 may correspond to audio (e.g., the audio 11) captured by a device 110 (e.g., the device 110a). The device 110 may be located in an indoor setting, such as a house, an office, a store, a vehicle, etc. In some embodiments, the audio data 202 may be a frequency domain representation of the audio captured by the device 110. In other embodiments, the audio data 202 may be a time domain representation of the audio.

At a step 304, the system(s) 120 may process the audio data 202 using an event detection component 210 to determine a detected event type 212 and a corresponding detection score 214. In some embodiments, the event detection component 210 may employ one or more ML models, such as a classifier embodied in a neural network (e.g., DNN, RNN, CNN, etc.). In some embodiments, the ML model(s) may be a multi-label classifier, where multiple labels/events may be assigned to a single instance of audio data. The event detection component 210 may determine whether or not one or more particular event types, from a set of predefined event types, is represented in the audio data 202. The event detection component 210 may output the detected event type 212, which may be text indicating the particular event type or may be a numerical value (or other type of identifier) identifying the particular event type. The event detection component 210 may output the detection score 214 corresponding to the detected event type 212, which may be a numerical value between 0 and 1 (or between a different range of values) and may indicate a probability/likelihood of the detected event type 212 being represented in the audio data 202. For example, if the event detection component 210 is configured to detect four event types, then the output of the event detection component 210 may be:

{detected event type=event type_1; detection score=0.5}

{detected event type=event type_2; detection score=0.8}

{detected event type=event type_3; detection score=0.1}

{detected event type=event type_4; detection score=0.9}

In some embodiments, the event detection component 210 may output a vector of detection scores, where the position of the detection score may correspond to a particular event type. For example, the output of the event detection component 210 may be the vector including the detection scores 214 {0.5, 0.8, 0.1, 0.9}, where the detection scores in the vector may correspond to {event type_1, event type_2, event type_3, event type_4}. The probability indicated in the detection score 214 may also be referred to as confidence score/level of the event detection component 210 in determining that the particular event type is represented in the audio data 202.

In an example embodiment, the event detection component 210 may be trained to detect the following event types in input audio data: (1) human speech, (2) human singing, (3) non-speech sounds by human, (4) human activity, and (5) special presence sounds. The event detection component 210 may detect the human speech event type when the audio data 202 includes speech from a person(s) (e.g., words spoken by one or more persons). The event detection component 210 may detect the singing event type when the audio data 202 includes singing by a person(s) (e.g., one or more persons carrying a tune, etc.). The event detection component 210 may detect the non-speech sounds by human event type when the audio data 202 includes certain non-speech vocal sounds made by a person, such as coughing, sneezing, yelling, laughing, crying, etc. The event detection component 210 may detect the human activity event type when the audio data 202 includes certain non-vocal sounds made by a person, such as footsteps (sounds made while walking or running), typing (e.g., typing on a keyboard), operating a device/appliance (e.g., a coffee machine, a microwave, a blender, etc.), and other sounds that may indicate a person(s) performing an activity. The event detection component 210 may detect the special presence sounds event type when the audio data 202 includes sounds that indicate certain predefined events such as glass breaking (e.g., the breaking a window or a door panel), a door opening, a window opening, a dog barking, an alarm sounding (e.g., a smoke alarm/fire alarm going off, house security alarm going off, etc.) and other events that may indicate presence of an intruder or other harmful activity in the indoor setting.

At a step 306, the system(s) 120 may process the detection scores 214 with respect to a threshold value(s) 222 using an initial threshold component 220. The initial threshold component 220 may receive one or more threshold values 222, which may be a numerical value between 0 and 1 (or another range that is the same as the detection score 214). The initial threshold component 220 may process the detection scores 214 in view of the threshold value(s) 222 to determine whether or not the detected event type 212 is represented in the audio data 202 based on its detection score. The initial threshold component 220 may output a true/false (yes/no) flag with respect to each of the detected event types 212 based on the corresponding detection score 214 satisfying the threshold value(s) 222 (e.g., based on the detection score 214 exceeding the threshold value(s) 222). In some embodiments, the threshold value(s) 222 may include one value that may be applied to each detected event type 212. For example, the threshold value 222 may be 0.8, and if the detection score 214a is equal to or above 0.8, then the flag 224a, corresponding to the detected event type 212a, is set to "true". As further example, if the detection score 214b is below 0.8, then the flag 224b, corresponding to the detected event type 212b, is set to "false". In other embodiments, the threshold values 222 may include different values to be applied to different event types. For example, the threshold values 222 may include a first value for the detected event type 212a, and if the corresponding detection score 214a exceeds the first value, then the corresponding flag 224a is set to "true." As further example, the threshold values 222 may include a second value (different then the first value) for the detected event type 212b, and if the corresponding detection score 214b exceeds the second value, then the corresponding flag 224b is set to "true."

At a step 308, the system(s) 120 may process the output of the initial threshold component 220 with respect to a bypass threshold value(s) 232 using a bypass threshold component 230. The bypass threshold component 230 may receive one or more bypass threshold values 232, which may be a numerical value between 0 and 1 (or another range that is the same as the detection score 214). In some embodiments, the bypass threshold value(s) 232 may be higher than the threshold value(s) 222. The bypass threshold component 230 may determine whether an event aggregation process, performed by an event aggregation component 250 described below, can be bypassed. The bypass threshold component 230 may be configured to bypass the event aggregation process when a particular event type(s) (referred to as a bypass event type) is detected with a high confidence by the event detection component 210. In this regards, the bypass threshold component 230 may process the detected event type 212, the detection score 214 and the flag 224 to make two determinations—(1) whether a particular event type is detected (i.e. the corresponding flag 224 is set to "true"); and (2) whether the detection score 214 for the particular event type satisfies the bypass threshold value(s) 232. The bypass threshold component 230 may be configured to bypass the event aggregation process for one or more event types that the event detection component 210 is capable of detecting with a certain level (high level) of accuracy. The event detection component 210 may be able to detect certain event types with a higher level of accuracy than other event types based on the available training data (e.g. quality of training data, amount of labeled training data, etc.), and based on the non-ambiguous nature of the events covered in the event type. For example, the event detection component 210 may be able to detect the human speech event type with a higher accuracy than the human activity event type, partly because there may be a large amount of training data available for human speech and the sounds covered in the human activity event type may vary a lot. For example, typing sounds (part of the human activity event type) may depend on how the person types, what kind of keyboard the person is using, etc. In contrast, any audio signal capturing speech has well-defined/known features indicating words spoken by a person.

In some embodiments, the particular bypass event type(s) may be predefined/set at the bypass threshold component 230. In an example embodiment, the bypass threshold component 230 may be configured to bypass the following three event types: (1) human speech, (2) singing, and (3) non-speech sounds by human. In some embodiments, the bypass threshold value(s) 232 may include one value that may be applied to each of the bypass event types. In other embodiments, the bypass threshold values 232 may include different values to be applied to different bypass event types.

At a decision step 310, the system(s) 120 may determine whether the detection score(s) 212 for one or more of the bypass event types satisfies the bypass threshold value(s) 232. If the detection score(s) 212 for one or more of the bypass event types does not satisfy the bypass threshold value(s) 232, then the system(s) 120 may perform event aggregation (e.g., a process 400 shown in FIG. 4) using the event aggregation component 250. If the detection score(s) 212 for one or more of the bypass event types satisfies the bypass threshold value(s) 232, then the system(s) 120 may perform a step 312.

In some embodiments, if any of the detection scores 214 for the bypass event types fails to satisfy the bypass threshold value(s) 232, then the system(s) 120 may perform event aggregation. In other embodiments, as long as one of the bypass event type/detection score 214 satisfies the bypass threshold value(s) 232, the system(s) 120 may bypass the event aggregation process.

At the step 312, the system(s) 120 may filter, using a max score component 236, the detected bypass event types based on the corresponding detection scores, by selecting the maximum/highest detection score. The max score component 236 may output event detected data 238, which may include (1) an indication that an event representing presence of a person (in the indoor setting where the device 110a is located) is detected; and (2) the maximum detection score. In some embodiments, the bypass threshold component 230 may send the detection score(s) 214 for the bypass event type to the max score 236 component. For example, if the detected event types 212a, 212b and 212c are set as the bypass event types, then the bypass threshold component 230 may send the detection scores 214a, 214b, and 214c corresponding, respectively, to the detected event types 212a, 212b and 212c. The max score component 236 may perform a maximum value function using the detection scores 214a, 214b and 214c to select the maximum/highest detection score (e.g., detection score 214a). The max score component 236 may include the selected detection score 214a in the event detected data 238, as the probability/confidence score that an event represented presence of a person is detected. Thus using the max score component 236, the system(s) 120 reduces the complexity of detecting various different event types to simply output that an event representing presence of a person is detected.

At a step 314, the system(s) 120 may determine, using a sensitivity threshold component 240, whether the maximum score in the event detected data 238 satisfies a user provided setting. The system(s) 120 may receive a user provided setting 242 or may determine the user provided setting 242 from profile data, stored at a profile storage 670, corresponding to a user of the device 110a. In some cases, the user, associated with the device 110a, may provide an input to control the number of alerts, representing a presence of a person, the user receives. For example, some users may live in noisy environments/neighborhoods, or the office/store may be located in a noisy environment/neighborhood. In such environments, the system(s) 120 may detect many instances of events representing presence of a person, however, in actuality the detected event may not be a presence of a person in the indoor setting. For example, the system(s) 120 may detect a person delivering a package at the door as an event representing presence of a person, however, the user may not want to be notified via an alert in this case.

The user may provide an input, represented in the user provided setting 242, to reduce the sensitivity of the system(s) 120 in outputting alerts. The sensitivity threshold component 240 may convert the user provided setting 242 to a threshold value, with respect to which the event detected data 238 may be processed. In some embodiments, the user provided setting 242 may be at a high level and may relate to all of the event types that the event detection component 210 is configured to detect. For example, the user provided setting 242 may be "low", "high", "medium" or "none." If the user provided setting 242 is "none" then the system(s) 120 may not perform any checks at the sensitivity threshold component 240, and may generate the output data 246 based on the detection score 214 satisfying the bypass threshold value(s) 232. If the user provided setting 242 is "low" (indicating the user wants to receive lower number of alerts), then, in some embodiments, the sensitivity threshold component 240 may determine a user-based threshold value that is higher than the bypass threshold value(s) 232 and higher than the initial threshold value(s) 222, where the score in the event detected data 238 has to satisfy the user based threshold for the sensitivity threshold component 240 to generate the output data 246. If the user provided setting 242 is "high" (indicating the user wants to receive more alerts), then, in some embodiments, the sensitivity threshold component 240 may determine a user-based threshold value that is lower than the bypass threshold value(s) 232 and/or lower than the initial threshold value(s) 222, where the score in the event detected data 238 or the detection score(s) 214 has to be satisfied for the sensitivity threshold component 240 to generate the output data 246.

In some embodiments, the user provided setting 242 may relate to different event types. For example, the user provided setting 242 may include a different indicators for different event types, such as "low" for a first event type, "high" for a second event type, etc. The sensitivity threshold component 240 may determine different user based threshold values for the different event types, and may determine if the appropriate detection scores 214 satisfy the respective user based threshold value. For example, the user may want to receive less alerts based on the special sounds event type, and more alerts based on the speech event type.

In some embodiments, the user provided setting 242 may indicate "no detection" for a third event type, indicating that the system(s) 120 should not detect that type of acoustic event. In this case, the event detection component 210 may filter its output of the detected event type 212 to not include the third event type.

If the maximum score does not satisfy the user provided setting 242, then at a step 318, the system(s) 120 may store event data indicating the audio data does not include an audio event of interest. This event data may be used to perform event aggregation as described below. The event data may be stored by the aggregation component 420 shown in FIG. 4. In some embodiments, the audio data may be discarded (delete from memory). If the maximum score satisfies the user provided setting 242, then at a step 316, the system(s) 120 may generate output data 246. The output data 246 may include data indicating an event representing presence of a person is detected. The system(s) 120 may send the output data 246 to the device 110a, which captured the audio corresponding to the audio data 202, and/or the system(s) 120 may send the output data 246 to another device 110b (associated with the device 110a via profile data) that may be proximate to a user so that the user can be alerted of the audio event (e.g., presence of a person, baby crying, someone crying out for help, fire alarm, etc.) in the indoor setting where the device 110a is located. The output data 246 may be text data, notification data, audio data representing synthesized speech, audio data representing a sound (e.g., an alarm), graphical data, or other type of data. In sending the output data 246 to a device 110, the system(s) 120 may be providing an alert to the user. Sending of the output data may cause the device 110 to receive/output an email, a text message, an app notification, a phone call to user, a phone call to monitoring service, a phone call to emergency contact, etc.

Figure 4:
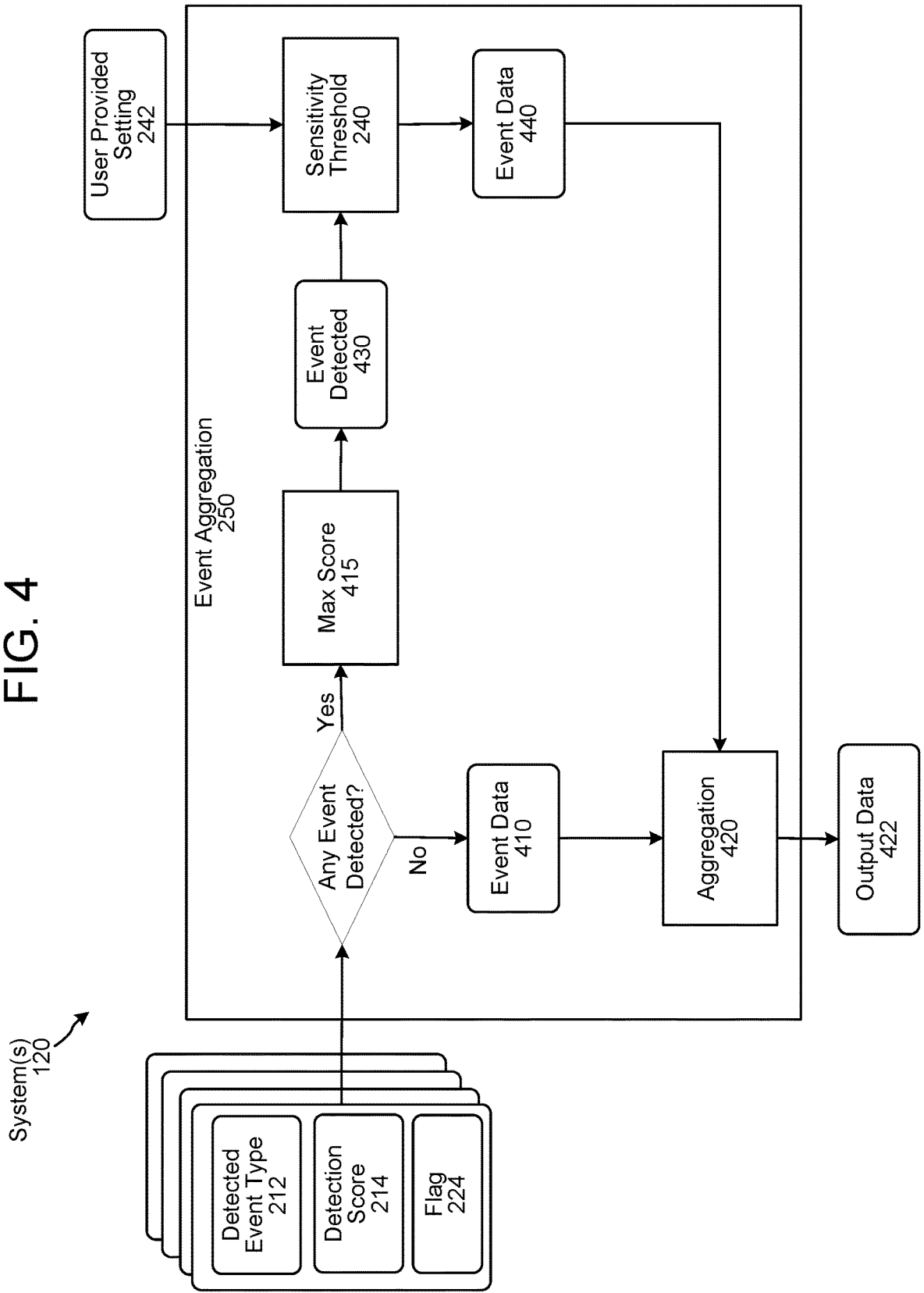
FIG. 4 is a conceptual diagram showing how a system may process audio data using event aggregation to detect one or more events, according to embodiments of the present disclosure.

FIG. 4 is a conceptual diagram showing how the system(s) 120 may process audio data using the event aggregation component 250, according to embodiments of the present disclosure. The components shown in FIG. 4 may be included in the system(s) 120. In other embodiments, the components shown in FIG. 4 may be included in the device 110 (e.g., the device 110a that captures the audio 11). In other embodiments, some of the components may be included in the system(s) 120 and the other components may be included in the device 110. In yet other embodiments, the functionality described in connection with FIG. 4 may be provided by the skill component 690/790 and/or the skill system(s) 625.

Figure 5:
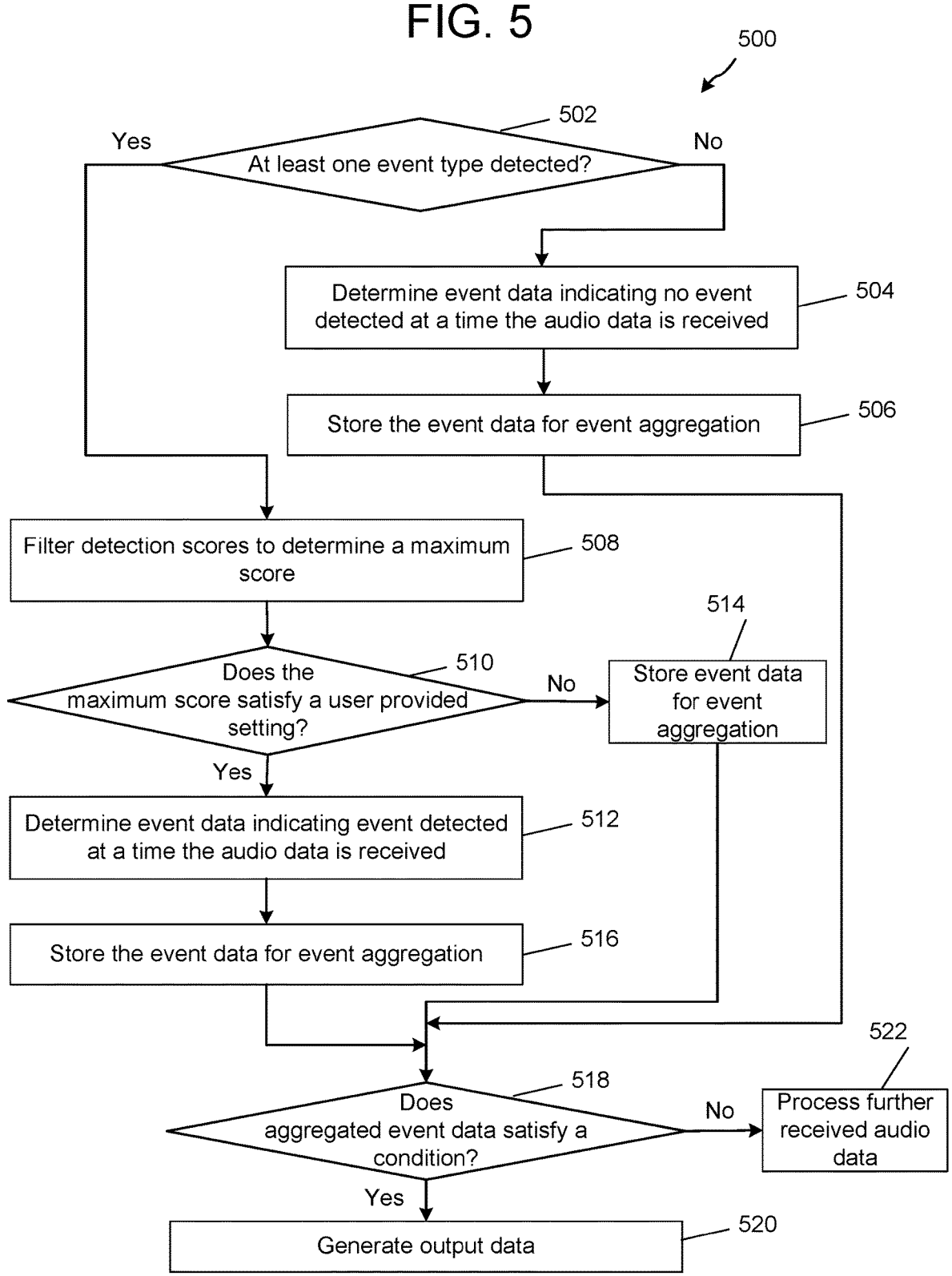
FIG. 5 is a flowchart illustrating an example process that may be performed by the system of FIG. 4, according to embodiments of the present disclosure.

When a bypass event type(s) is detected with a low probability/confidence (or no probability/confidence), then the system(s) 120 may perform event aggregation for a period of time. FIG. 5 is a flowchart illustrating an example process 500 that may be performed by the event aggregation component 250, according to embodiments of the present disclosure. The event aggregation component 250 may process the detected event type(s) 212, the corresponding detection score(s) 214 and the corresponding flag(s) 224 outputted by the initial threshold component 220 (shown in FIG. 2). At a decision step 502, the event aggregation component 250 may determine whether any event type was detected. The event aggregation component 250 may make this determination based on the flag(s) 224. For example, if all the flags 224 are set to "false", then the event aggregation component 250 may determine that no event is detected, and may then perform a step 504. If at least one of the flags 224 is set to "true", then the event aggregation component 250 may determine that at least one event type is detected, and may then perform a step 508.

At the step 504, the event aggregation component 250 may determine event data 410 indicating no event is detected at a time the audio data is received. The event data 410 may include a timestamp representing when the audio data 202 is received by the system(s) 120 (or when the audio corresponding to the audio data 202 is captured by the device 110a). The event data 410 may also include a Boolean value set to "false" (or "0" or "no") representing that an event (indicating presence of a person) is not detected in the audio data 202. At a step 506, the event aggregation component 250 may store the event data 410 for event aggregation. The event data 410 may be sent to an aggregation component 420 for storing and tracking. After performing the step 506, the event aggregation component 250 may proceed to a decision step 518 described below.

At the step 508, the event aggregation component 250 may, using a max score component 415, filter the detection scores 214 to determine a maximum score. The max score component 415 may perform a maximum value function using the detection scores 214, outputted by the event detection component 210, to select the maximum/highest detection score. The max score component 415 may output event detected data 430, which may include (1) an indication that an event representing presence of a person (in the indoor setting where the device 110a is located) is detected; and (2) the maximum detection score. The max score component 415 may include the maximum detection score 214 in the event detected data 430, as the probability/confidence score that an event representing presence of a person is detected. Thus using the max score component 415, the system(s) 120 reduces the complexity of detecting various different event types to simply output that an event representing presence of a person is detected.

At a decision step 510, the event aggregation component 250 may determine, using the sensitivity threshold component 240 (described above), whether the maximum score satisfies the user provided setting 242. The event aggregation component 250 may perform the same or similar functionality as described above in relation to the sensitivity threshold component 240 of FIG. 2.

If the maximum score satisfies the user provided setting 242, then at a step 512, the event aggregation component 250 may determine event data 440 indicating an event is detected at a time the audio data 202 is received. The event data 440 may include a timestamp representing when the audio data 202 is received by the system(s) 120 (or when the audio corresponding to the audio data 202 is captured by the device 110a). The event data 440 may also include a Boolean value set to "true" (or "1" or "yes") representing that an event (indicating presence of a person) is detected in the audio data 202.

If the maximum score does not satisfy the user provided setting 242, then at a step 514, the event aggregation component 250 stores event data indicating the event does not represent an audio event of interest. The event aggregation component 250 may determine event data including (1) a timestamp representing when the audio data 202 is received by the system(s) 120 (or when the audio corresponding to the audio data 202 is captured by the device 110a) and (2) an indication that the event is rejected. Such event data may be sent to the aggregation component 420 for storing and tracking. After performing the step 514, the event aggregation component 250 may proceed to the decision step 518.

At a step 516, the event aggregation component 250 may store the event data 440 for event aggregation. The event data 440 may be sent to the aggregation component 420 for storing and tracking. After performing the step 516, the event aggregation component 250 may proceed to the decision step 518 described below.

At the decision step 518, the event aggregation component 250, may determine, using the aggregation component 420, whether aggregated event data satisfies a condition. The aggregated event data may be the event data 410 or 440 stored by the aggregation component 420 in the steps 506, 514 and 516. The aggregation component 420 may check a predefined condition relating to a number of events that have to be detected in a period of time before sending an alert to the user (i.e. output data to the device(s) 110). For example, the condition may indicate that an alert may be sent after at least three events (not necessarily of the same event type) have been detected within 60 seconds. In another example, the condition may indicate that an alert may be sent after at least two consecutive events (not necessarily of the same event type) have been detected within 30 seconds. As such, the aggregation component 420 may process the timestamp included in the stored event data along with the Boolean value indicating whether or not an event was detected to determine whether the condition is satisfied. In doing so, the event aggregation component 250 enables the system(s) 120 to output an alert after the system is more confident that an event representing a presence of a person is detected.

In some embodiments, the aggregation component 420 may determine a user based condition using the user provided setting 242 that the aggregated events has to satisfy before the output data 422 is generated. For example, if the user provided setting 242 is "low" (indicating the user wants to receive more alerts), then the aggregation component 420 may determine the user based condition to be a lower number of events to be detected within a period of time and/or may determine the user based condition to be a smaller period of time within which the number of events has to be detected. As a further example, if the user provided setting 242 is "high" (indicating the user wants to receive fewer alerts), then the aggregation component 420 may determine the user based condition to be a higher number of events to be detected within a period of time and/or may determine the user based condition to be a larger period of time within which the number of events has to be detected. The number of detected events and/or the period of time within which the number of events has to be detected may be adjusted on event type basis using the user provided setting 242.

If the aggregated event data satisfies the condition, then at a step 520, the aggregation component 420 may generate output data 422. The output data 422 may include data indicating an event representing presence of a person is detected. The system(s) 120 may send the output data 422 to the device 110a, which captured the audio corresponding to the audio data 202, and/or the system(s) 120 may send the output data 422 to another device 110b (associated with the device 110a via profile data) that may be proximate to a user so that the user can be alerted of the audio event (e.g., presence of a person, baby crying, someone crying out for help, fire alarm, etc.) in the indoor setting where the device 110a is located. The output data 422 may be text data, notification data, audio data representing synthesized speech, audio data representing a sound (e.g., an alarm), graphical data, and/or other type of data. In sending the output data 422 to a device 110, the system(s) 120 may be providing an alert to the user. Sending of the output data may cause the device 110a or the device 110b to receive/output an email, a text message, an app notification, a phone call to user, a phone call to monitoring service, a phone call to emergency contact, etc.

If the aggregated event data does not satisfy the condition, then at a step 522 the system(s) 120 may process further received audio data. The system(s) 120 may receive further audio data from the device 110a, where the further audio data may be received immediately subsequent to the audio data 202. The system(s) 120 may process the further received audio data in a similar manner as described above in relation to the audio data 202, for example, using the processes 300 and 500.

In some embodiments, the system(s) 120 may receive feedback data from a user associated with the device 110a, where the feedback data may be responsive to the output data (representing the alert) presented to the user. The feedback data may be based on an input received from the user, where the input may indicate, at a high-level, whether the user was satisfied or unsatisfied with the system(s) 120 output of the alert. In other embodiments, the feedback data may be at an event type level, where the system(s) 120 may further output the type of event detected, in response to which the alert was outputted, and the feedback data may indicate whether the detected event was accurate or inaccurate according to the user. The input may be a touchscreen input, voice input, gesture input, or other type of input, via the device 110a, the device 110b or another device 110. The input may be provided at the time the alert is being outputted by the device 110, or may be provided at a later time after the alert was outputted. The system(s) 120 may associate the feedback data with the audio data 202 and/or the output data 246 or the output data 422, as appropriate. The system(s)

120 may use the feedback data to update (retrain) the event detection component 210 to detect certain event types more accurately. The system(s) 120 may use the feedback data to update other components and values shown in FIGS. 2 and 4, such as, the threshold value(s) 222, the bypass threshold value(s) 232, the aggregation component 420, and others.

Figure 6:
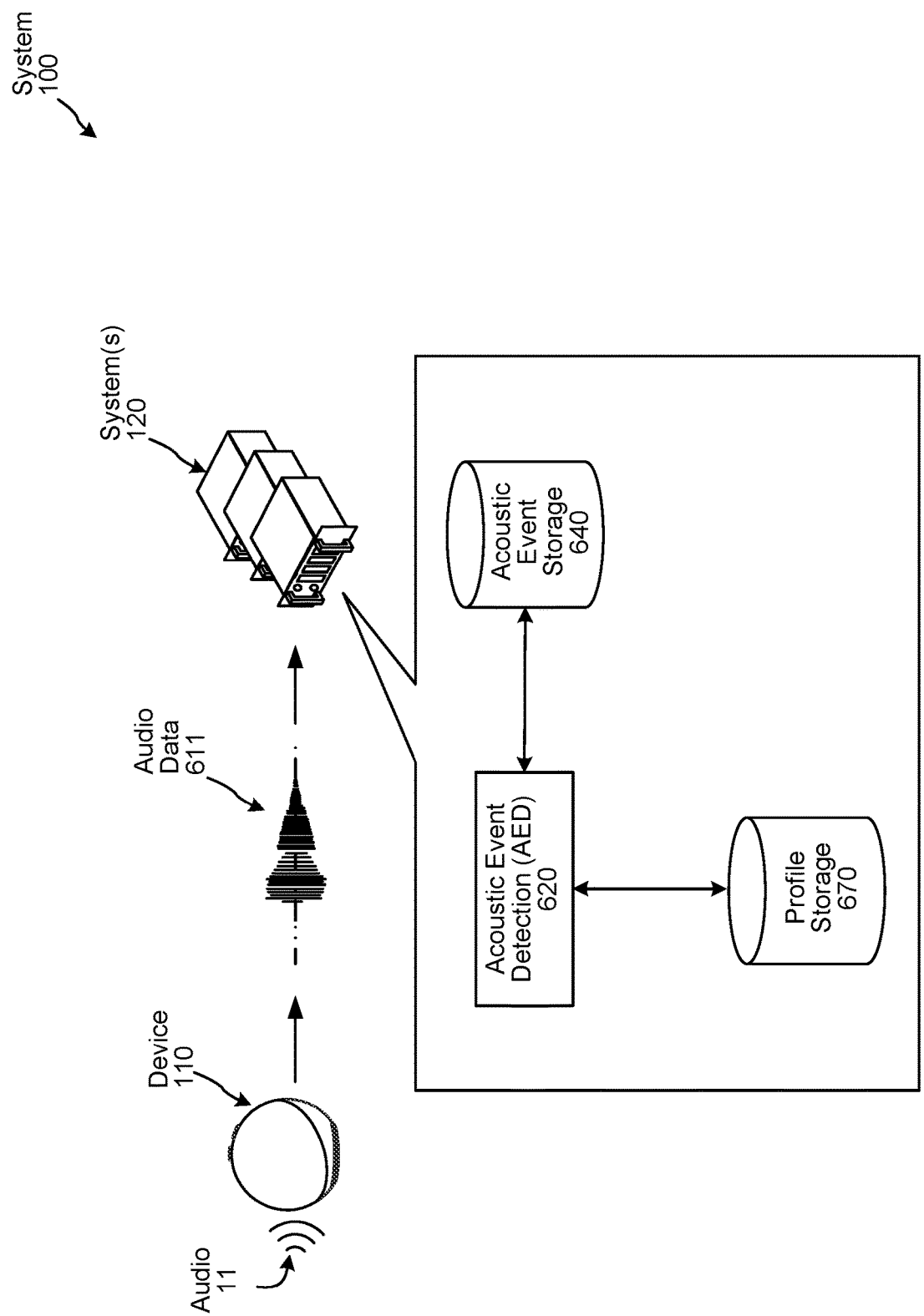
FIG. 6 is a conceptual diagram of components of a system, according to embodiments of the present disclosure.

The system 100 may operate using various components as illustrated in FIG. 6. The various components may be located on a same or different physical devices. Communication between various components may occur directly or across a network(s) 199.

A microphone or array of microphones (of or otherwise associated with a device 110) may capture audio 11. The device 110 may processes audio data as described below in relation to FIG. 7. The system(s) 120 may be an acoustic event detection system configured to detect occurrence of one or more acoustic events. In addition to or instead of audio data, in some embodiments, the system(s) 120 may use other data captured by one or more sensors of the device 110 or one or more sensors in communication with the system(s) 120 and located within a predefined area of the device 110 (e.g., in the same indoor setting, in the same office building, in the same house, etc.), to determine occurrence of one or more events of interest.

In some embodiments, the system(s) 120 may include an acoustic event detection (AED) component 620. The AED component 620 may include one or more components described in relation to FIGS. 2 and 4. For example, the AED component 620 may include the event detection component 210, the initial threshold component 220, the bypass threshold component 230, the max score component 236, the sensitivity threshold component 240, and the event aggregation component 250. The AED component 620 may process the audio data 611 received from the device 110 to determine whether the audio data 611 corresponds to one or more events of interest. The AED component 620 may perform one or more functionalities/operations described in relation to FIGS. 2-5.

The system(s) 120 may further include an acoustic event storage 640, which may be configured to store data generated by the AED component 620. For example, the acoustic event storage 640 may store event data 410, 440, such as the data stored by the aggregation component 420. As further example, the acoustic event storage 640 may store the output data 246, 422. The AED component 620 may associate an identifier (e.g., a session identifier or an event identifier) with the data generated by the AED component 620 to track detection of events related to a particular device 110 and to facilitate event aggregation. In some embodiments, the identifier may be associated with stored data based on when the audio data corresponding to the stored data is received. For example, first audio data 611 may be received from the device 110 at a first time, and second audio data 611 may be received from the device 110 at a second time, where the first time and the second time may be within a certain threshold duration. In some embodiments, the identifier may be associated with stored data based on the audio data being received from the device 110 while being in a particular device mode. For example, first audio data from the device 110 may be received while the device 110 is an away mode, and second audio data may be received from the device 110 while the device 110 is still in the away mode, without there being a change in the device mode between when the first audio data was received and when the second audio data was received.

The system 120 may include profile storage 670. The profile storage 670 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 670 may include one or more user profiles. Each user profile may be associated with a different user profile identifier. Each user profile may include various user identifying data. Each user profile may also include preferences of the user. Each user profile may include one or more device identifiers, representing one or more devices registered to the user.

The profile storage 670 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 670 may include one or more device profiles. Each device profile may be associated with a different device identifier/device profile identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

The user profile in the profile storage 670, in some embodiments, may include one or more user provided settings (e.g., the user provided setting 242) related to which acoustic/audio events are of interest to the user, preference of how sensitive the detection of audio events is to be, how many alerts the user prefers to receive in a given period of time, and other settings.

The foregoing describes illustrative components and processing of the system 120. In at least some embodiments, the device 110 may be configured to include some or all of the components, and perform some or all of the processing, of the system 120 described above. FIG. 7 illustrates such a configured device 110.

In at least some embodiments, the system 120 may receive the audio data 611 from the device 110, to recognize audio events represented in the audio data 611. In at least some embodiments, these functions involve sending directives (e.g., commands), from the system 120 to the device 110 (and/or other devices 110) to cause the device 110 to perform an action, such as output an audible response via a loudspeaker(s), and/or control secondary devices in the environment by sending a control command to the secondary devices.

The device 110 may include a device mode component 710 that may be configured to operate one or more components of the device 110 (e.g., components shown in FIG. 8) based on a device mode, and may be used by the device 110 to determine when to send audio data to one or more remote systems for further processing. One example device mode may be "wakeword" mode or device-directed speech mode, where the device 110 may process captured audio 11 to determine whether it includes device-directed speech, and if it does include device-directed speech, then the device 110 may send the audio data 611, corresponding to the audio 11, to a remote speech processing system (not shown). In detecting device-directed speech, the device 110, in some embodiments, may use one or more machine learning models to determine that the audio 11 represents speech from a person. In some embodiments, after detecting the audio 11 represents speech, the device 110 may also use one or more machine learning models to determine whether the speech includes one or more predefined keywords (e.g., a wakeword such as "Alexa"). If a keyword(s) is included in the speech, then the device 110 may determine that the audio 11 includes device directed speech. The device 110 may then send the audio data 611, which may correspond to a spoken input/utterance, to the speech processing system.

Another example device mode may be an "away" mode or a "monitoring" mode. In such modes, the device mode component 710 send the captured audio 11 to an audio detection component 720 for further processing before determining to send the audio data 611 to the system(s) 120 for processing. In such modes, the device mode component 710 may cause one or more microphones (e.g., microphones 820) of the device 110 to be active/open to capture any audio in the device's 110 environment. When the audio 11 is "heard" or captured by the device 110, then the device mode component 710 may send the audio 11 or the audio data 611 corresponding to the audio 11 to the audio detection component 720.

The audio detection component 720 may be configured to process audio/audio data to determine whether an event of interest is detected. In some embodiments, the audio detection component 720 may use one or more machine learning models, such as a binary classifier model. The binary classifier model may be configured to determine whether or not an event of interest in represented in the audio 11/audio data 611. The binary classifier may output a Boolean value representing "true" or "false" corresponding to whether an event of interested is detected or not. The audio detection component 720 may be configured to detect a wide range of events, and may be trained using audio data including various different events. Examples of such events may include, but is not limited to, speech from a person, baby crying, glass breaking, audio from a TV, audio outputted by stereo speakers, footsteps, operation of appliances, fire alarm, smoke alarm, home security alarm, alarms on other devices, opening or closing of doors or windows, a person shouting/yelling, etc. The audio detection component 720 may be a coarse/fast model configured to quickly determine whether or not the audio 11/audio data 611 represents an event of interest. The audio detection component 720 may send the audio data 611 to the system(s) 120, when an event of interest is detected in the audio 11/audio data 611, for further processing as described herein.

Machine learning (ML) is a valuable computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, predictive analyses, and many more.

Trained models come in a variety of forms including trained classifiers, Support Vector Machines (SVMs), neural networks (such as deep neural networks (DNNs), recurrent neural networks (RNNs), or convolutional neural networks (CNNs)), random forests, isolation forests, and others. As an example, a neural network typically includes an input layer, an output layer and one or more intermediate hidden layers where the input layer is configured to take in a certain kind of data and the output layer is configured to output the desired kind of data resulting from the network and the hidden layer(s) perform a variety of functions to generate output data from the input data.

Various techniques may be used to train ML models including backpropagation, statistical learning, supervised learning, semi-supervised learning, stochastic learning, or other known techniques. In supervised learning a model may be configured to infer a function from labeled training data. Thus a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

FIG. 8 is a block diagram conceptually illustrating example components of a device 110 according to the present disclosure. FIG. 9 is a block diagram conceptually illustrating example components of a system, such as the system 120 or a skill system 625. A system (120/625) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/625) may be included in the system 100 of the present disclosure, such as one or more systems 120 for performing ASR processing, one or more systems 120 for performing NLU processing, and one or more skill systems 625, etc. In operation, each of these systems may include computer-readable and computer-executable instructions that reside on the respective device (120/625), as will be discussed further below.

Each of these devices (110/120/625) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/625) may also include a data storage component (808/908) for storing data and controller/processor-executable instructions. Each data storage component (808/908) may individually include one or more non-volatile storage types such as magnetic storage, optical storage, solid-state storage, etc. Each device (110/120/625) may also be connected to removable or external non-volatile memory and/or storage (such as a removable memory card, memory key drive, networked storage, etc.) through respective input/output device interfaces (802/902).

Computer instructions for operating each device (110/120/625) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/625) includes input/output device interfaces (802/902). A variety of components may be connected through the input/output device interfaces (802/902), as will be discussed further below. Additionally, each device (110/120/625) may include an address/data bus (824/924) for conveying data among components of the respective device. Each component within a device (110/120/625) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to a network(s) 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device 110, the system 120, and/or a skill system 625 may include their own dedicated processors, memory, and/or storage. Alternatively, one or more of the components of the device 110, the system 120, and/or a skill system 625 may utilize the I/O interfaces (802/902), processor(s) (804/904), memory (806/906), and/or storage (808/908) of the device(s) 110, system 120, or the skill system 625, respectively. Thus, the ASR component 650 may have its own I/O interface(s), processor(s), memory, and/or storage; the NLU component 660 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 625, as described herein, are illustrative, and may be located as a stand-alone device or may be included, in whole or in part, as a component of a larger device or system.

As illustrated in FIG. 10, multiple devices (110a-110l) may process as part of the system 100. The network(s) 199 may include a local or private network or may include a wide network such as the Internet. Devices may be connected to the network(s) 199 through either wired or wireless connections. For example, the system 100 may include a speech-controlled device(s) 110a, a smart phone(s) 110b, a smart watch(s) 110c, a tablet computer(s) 110d, a vehicle(s) 110e, a speech-controlled display device(s) with a display 110f, a smart television(s) 110g, a washer(s)/dryer(s) 110h, a refrigerator(s) 110i, a microwave(s) 110j, earbuds 110l, and/or a wearable ring(s) 110m.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    receiving first audio data representing first audio captured by a first device;
    processing the first audio data to determine the first audio represents a first instance of a first type of event corresponding to presence of a person;
    receiving second audio data representing second audio captured by the first device;
    processing the second audio data to determine the second audio represents a second instance of the first type of event;
    determining the first instance and second instance occurred within a first window of time;
    based at least in part on the first instance and second instance occurring within the first window of time, determining first output data representing aggregate event data corresponding to the first type of event; and
    causing presentation of the first output data.

2. The computer-implemented method of claim 1, further comprising:
    determining a first number of instances of the first type of event occurred within the first window of time,
    wherein determination of the first output data is further based at least in part on the first number of instances occurring within the first window of time.

3. The computer-implemented method of claim 1, further comprising:
    receiving third audio data representing third audio captured by the first device;
    processing the third audio data to determine a score indicating that the third audio represents a third instance of the first type of event;
    determining the score satisfies a threshold;
    based at least in part on the score satisfying a threshold, determining second output data indicating occurrence of the third instance while bypassing from performing aggregation with regard to the third instance; and
    causing presentation of the second output data.

4. The computer-implemented method of claim 3, further comprising:
    determining the first type of event corresponds to configuration data representing satisfaction of the threshold corresponds to bypassing event aggregation processing for certain instances of the first type of event.

5. The computer-implemented method of claim 1, further comprising:
    determining a score indicating that the first audio represents the first instance; and
    determining the score fails to satisfy a threshold,
    wherein determination of the first output data is based at least in part on the score failing to satisfy the threshold.

6. The computer-implemented method of claim 1, further comprising:
    determining a first score indicating that the first audio represents the first instance;
    determining a second score indicating that the second audio represents the second instance; and
    determining that at least one of the first score or the second score satisfies a threshold,
    wherein determination of the first output data is based at least in part on at least one of the first score or the second score satisfying the threshold.

7. The computer-implemented method of claim 1, wherein causing presentation of the first output data comprises causing presentation of a graphical representation of the first output data.

8. The computer-implemented method of claim 1, wherein causing presentation of the first output data comprises causing a second device to present the first output data, the second device being different from the first device.

9. The computer-implemented method of claim 1, wherein the first type of event corresponds to a footstep.

10. The computer-implemented method of claim 1, wherein the first type of event corresponds to speech.

11. A system comprising:
    at least one processor; and
    at least one memory comprising instructions that, when executed by the at least one processor, cause the system to:
        receive first audio data representing first audio captured by a first device;
        process the first audio data to determine the first audio represents a first instance of a first type of event corresponding to presence of a person;
        receive second audio data representing second audio captured by the first device;
        process the second audio data to determine the second audio represents a second instance of the first type of event;
        determine the first instance and second instance occurred within a first window of time;
        based at least in part on the first instance and second instance occurring within the first window of time, determine first output data representing aggregate event data corresponding to the first type of event; and
        cause presentation of the first output data.

12. The system of claim 11, wherein the at least one memory further comprises instructions that, when executed by the at least one processor, further cause the system to:
    determine a first number of instances of the first type of event occurred within the first window of time, wherein determination of the first output data is further based at least in part on the first number of instances occurring within the first window of time.

13. The system of claim 11, wherein the at least one memory further comprises instructions that, when executed by the at least one processor, further cause the system to:
receive third audio data representing third audio captured by the first device;
process the third audio data to determine a score indicating that the third audio represents a third instance of the first type of event;
determine the score satisfies a threshold;
based at least in part on the score satisfying a threshold, determine second output data indicating occurrence of the third instance while bypassing from performing aggregation with regard to the third instance; and
cause presentation of the second output data.

14. The system of claim 13, wherein the at least one memory further comprises instructions that, when executed by the at least one processor, further cause the system to:
determine the first type of event corresponds to configuration data representing satisfaction of the threshold corresponds to bypassing event aggregation processing for certain instances of the first type of event.

15. The system of claim 11, wherein the at least one memory further comprises instructions that, when executed by the at least one processor, further cause the system to:
determine a score indicating that the first audio represents the first instance; and
determine the score fails to satisfy a threshold,
wherein determination of the first output data is based at least in part on the score failing to satisfy the threshold.

16. The system of claim 11, wherein the at least one memory further comprises instructions that, when executed by the at least one processor, further cause the system to:
determine a first score indicating that the first audio represents the first instance;
determine a second score indicating that the second audio represents the second instance; and
determine that at least one of the first score or the second score satisfies a threshold,
wherein determination of the first output data is based at least in part on at least one of the first score or the second score satisfying the threshold.

17. The system of claim 11, wherein the instructions that cause the system to cause presentation of the first output data comprises instructions that, when executed by the at least one processor, cause the system to cause presentation of a graphical representation of the first output data.

18. The system of claim 11, wherein the instructions that cause the system to cause presentation of the first output data comprises instructions that, when executed by the at least one processor, cause the system to cause a second device to present the first output data, the second device being different from the first device.

19. The system of claim 11, wherein the first type of event corresponds to a footstep.

20. The system of claim 11, wherein the first type of event corresponds to speech.

* * * * *